United States Patent Office 3,143,652
Patented Aug. 4, 1964

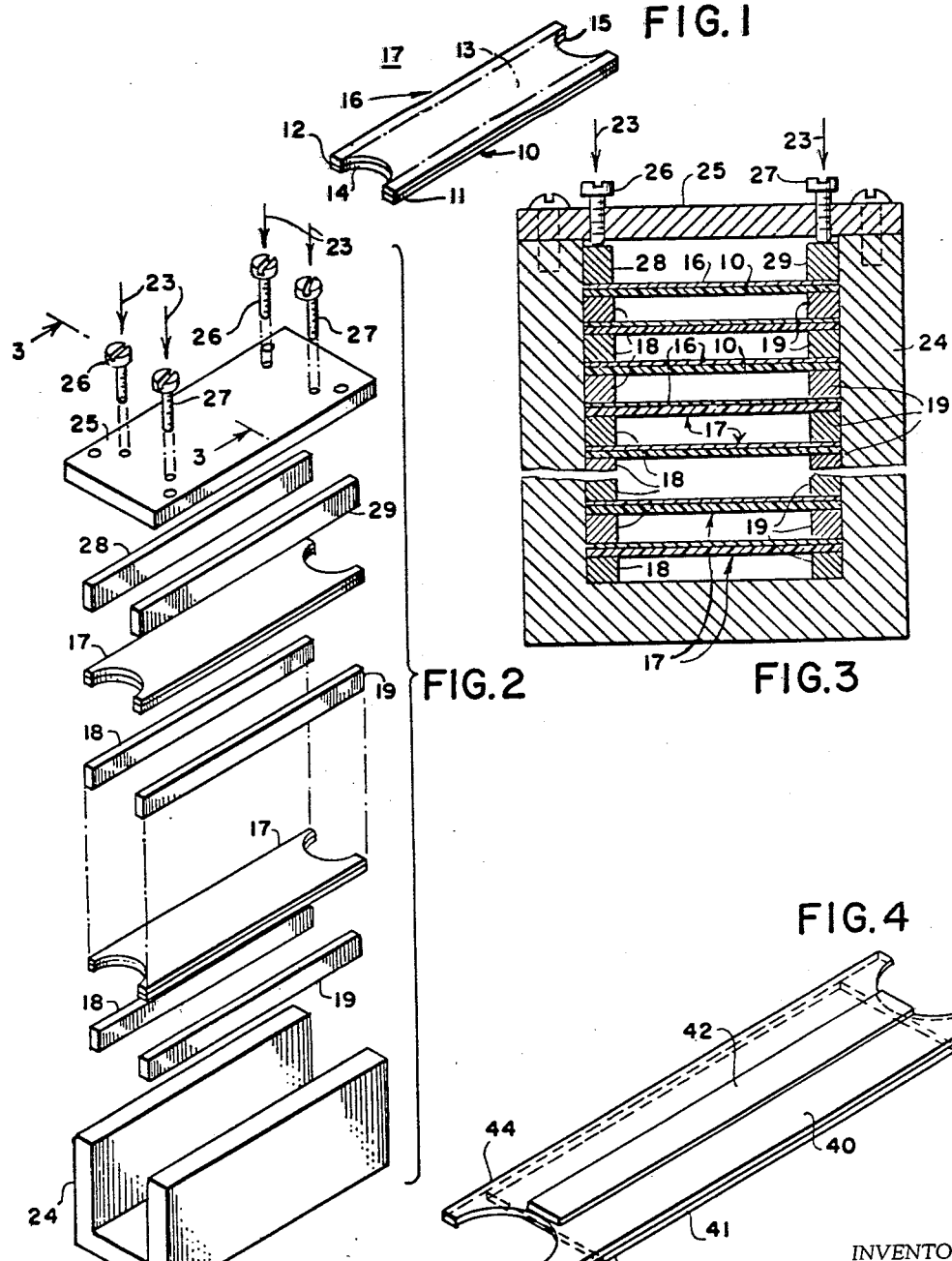

3,143,652
X-RAY COLLIMATOR COMPRISING A PLURALITY OF SPACED PLASTIC LAMINA WITH X-RAY ABSORBENT MATERIAL COATED THEREON
John E. Bigelow, Milwaukee, Wis., assignor to General Electric Company, a corporation of New York
Original application May 31, 1960, Ser. No. 32,689. Divided and this application Mar. 29, 1962, Ser. No. 189,947
7 Claims. (Cl. 250—105)

This invention relates to the aligning of materials having physical properties of interest in particular configurations having value and utility in various electromagnetic control applications. More particularly, this invention relates to articles forming parallel arrays of surface areas, i.e., wherein the surface areas are disposed in equidistant or equipotential intervals such that any two corresponding points on any two areas are the same distance as any other corresponding points at other coordinate positions of the areas, and forming areas that are truly flat and more planar than has heretofore been possible in the art. This application is a division of my copending application Serial No. 32,689, filed May 31, 1960.

It is often the case that uniformly parallel arrays of certain coating materials or films are required in the art to perform various electrical and electromagnetic control functions. For example, consider the requirements in X-ray diffraction and spectroscopy wherein collimators are utilized to select and pass only that portion of X-radiation propagating along a path having a constant angle from the crystal planes of a reflecting crystal used in the spectrometer. The collimating devices used in the X-ray technology and in particular, in X-ray spectroscopy, are known in the art as Soller Slits. These Soller Slits perform their collimating function as a consequence of their geometry and the material of which they are comprised. More specifically, the Soller Slits are formed by an array of parallel plates or laminas of X-radiation absorbent material, such as lead. Any material having a high atomic number and physically adapted to be formed thinly for use as laminas may be used as the absorbent material. The collimator, when interposed in the path of X-radiation propagating in polydirectional paths, absorbs the X-radiation propagating therethrough other than those rays traveling parallel to the planes of the laminal array, i.e., other than traveling parallel to the slits. It follows that in order to provide a highly monodirectional beam, that is, in order for the collimating function to be efficiently provided, the laminas of X-ray absorbent material must be very close to each other. The closer they are together, the greater will be the degree of mono-directivity that results.

Concomitant with the need for the absorbent laminas to be closely spaced is the requirement that each of the plates be extremly thin, so as to eliminate as little of the X-radiation possible which travels in the desired parallel path direction. The thicker the absorbent laminas, the more of the X-radiation traveling in the desired direction that will be undesirably absorbed. The dual requirement that the spaces between the laminas be exceedingly small, and that the plates or absorbent films be even thinner than the spacing therebetween provides a problem in construction not readily surmounted. For example, in typically desirable Soller Slits constructions, the total spacing between absorbing laminas may be less than .003 inch. A typically desirable thickness of a lead lamina is a small fraction of .001 inch. Thin metal sheets or films of this thickness are subject to warping and buckling in area sizes often required for the Soller Slits, e.g., 1 x 4 inches defining the planar area. Buckled absorber laminas result in the transmission of some of the radiation at undesired angles while improperly absorbing some radiation in the desired mono-directional path.

In other technologies, the need to maintain metallic films or plates in rigidly parallel relation often occurs. Thus, in electrical capacitor construction, it is often desirable to maintain a multiplicity of alternate layers of insulating and conducting material disposed in equipotential planar areas, so that the capacitive value of each series of conductive-insulating-conductive sheets is maintained accurately the same. Thus, it is desirable that every given capacitive array, i.e., two sheets of conductive material with an intermediate layer of insulating material, have the property that for every pair of corresponding points on the two layers of conductive material, the distance between the two points perpendicularly through the insulating material be the same as the distance between any other two corresponding points at any other location on the conductive planes. In this way, each capacitive array will have a value of capacitance equal to the succeeding capacitive arrays, such that an overall capacitance can be predesigned of any required value by stacking a series of such arrays.

In the microwave art, strip lines have been recently developed and achieved considerable commercial application. In general, a strip line comprises a sheet of dielectric material with a film of highly conductive metallic material disposed on each face of the dielectric. In this way, the outline of a microwave waveguide circuit may be provided with a minimum of space utilization. More specifically, a film of copper material may be provided on one face of the dielectric material which is in the form, for example, of one broad wall of a rectangular waveguide, while on the immediately opposing face of the dielectric sheet, a corresponding copper film is provided to occupy the position of that which may be considered an opposing wall of the waveguide structure. In this type of strip line circuitry, the electromagnetic radiation propagates in large measure through the dielectric material bounded by the opposing films of highly conductive material. As as known to those skilled in the art, any variation, especially an abrupt one, in the distance between the two conductive films, i.e., in the dimension of the dielectric sheet thickness between the films, represents an impedance discontinuity for the propagating electromagnetic wave energy and results in an undesirable reflection at the discontinuity and consequent loss of microwave energy. It is therefore necessary to provide a uniformly parallel disposition of two highly conductive metallic films in various circuit configurations for the strip line microwave art.

It is known in the art that when a thin metallic sheet is required to be disposed such that it be in a true planar condition, or a condition such that it be parallel to another metallic film over a broad area without the undesirable effects of buckling or warping of the film due to its thinness, that the thin metallic material may be mounted on some other support material, either impervious or transparent to the energy which is to be acted upon or processed by the supported film. Such structural support devices often take the form of dielectric or insulating sheets upon which thin metallic films may be evaporated or sprayed, or upon which thin metal foil may be secured by gluing or other means. Although the support thus provided is of great benefit, the fidelity of the planar or parallel relationship is no better than that provided by the evenness and physical regularity of the support structure. Therefore, the ability to construct the dielectric support in the required manner is a limiting factor in providing the desired relationship for the material which it supports.

It is an object of this invention to provide a method for constructing, and a design of construction, which makes possible the disposition of thin films of material in accurately flat planar and/or parallel arrays.

It is a more specific object of this invention to provide an array of Soller Slits wherein the planes of X-ray absorbent material have a degree of parallelism heretofore not achieved in the prior art.

In accordance with the principles of the present invention, a preferred embodiment of the invention in the form of a collimator or array of Soller Slits is presented for illustrative purposes, wherein a thin sheet of support material which may be a plastic such as polyethylene or the terephthalic acid polyester, and having certain properties to be described in detail below, is covered with an extremely thin coating of X-radiation absorbent material, such as may be obtained by a thin film of a metal such as lead. A laminate structure is thus formed, with the polyethylene or the terephthalic acid polyester and absorbent material forming the two laminas of the structure. The unit thus formed by the two laminas, when placed parallel to a second similar unit, forms therebetween the Soller Slit. Several such units in parallel array comprise the collimator of interest. In accordance with the invention, a multiplicity of such laminated units are stacked together and compressed. The entire structure is then heated in a manner to be described in greater detail below, whereby the polyethylene or the terephthalic acid polyester, or other plastic material shrinks in a particularly advantageous manner. The tensions within the plastic material are exerted such that the material shrinks in a direction perpendicular to its planar faces, and the plastic material is redistributed such that the planar surfaces smooth and flatten out. Since the X-ray absorbent layer is itself extremely thin on the plastic material, it assumes the same corresponding flat planar condition as does the plastic sheet.

At the ends of the plastic sheets, which are not structurally supported in the compression and heating process, an undesired buckling or corrugation had been found to develop as a result of the generation of unbalanced internal forces at the air-plastic edge interface.

It is a feature of this invention that by cutting out a portion of the unsupported ends of the planar sheet, so as to provide, for example, an arcuate edge rather than a straight edge, the internal forces of the plastic material during the shrinkage developed by the heating operation are such that the shrinking process may occur without buckling the plastic sheet.

The shrinkage of the plastic sheets results in a spacing between each laminated unit, such that there is an air space between the plastic sheet lamina of one unit and the metal film or lamina of the next unit. The degree of parallelism achieved, therefore, is in this way no longer a function of the shape of the plastic support material, but becomes a function of the spacing arrangement between the sheets, which is readily controlled to provide the desired degree of parallelism.

The method and design in accordance with the invention are also applied to a capacitor embodiment and a microwave strip line embodiment described in detail hereinafter.

The manner in which the principles of the invention are utilized may be more fully understood upon reference to the accompanying specification taken in connection with the accompanying drawings, in which:

FIGURE 1 is a perspective view of a lamination unit comprising a sheet or lamina of plastic material preferably of the terephthalic acid polyester, commercially available as Mylar, but having the desired characteristic of tending to shrink due to internal forces when the material is heated and then subsequently cooled; a thin lamina of X-ray absorbent material coats the plastic lamina;

FIGURE 2 is a perspective exploded view illustrating the manner in which several metallized plastic sheets or laminas are arranged in vertically stacked relationship with thin spacers between them along the two elongated border edges of adjacent laminas;

FIGURE 3 is a cross section of a compressed version of the exploded view of FIGURE 2; and FIGURE 4 represents the application of the principles of the invention to microwave strip line devices.

As shown in FIGURE 1, a sheet 10 of plastic material such as a terephthalic acid and polyester film, having a thickness which may be, for example in practical cases, a major fraction of .001 of an inch, is used as a base or support lamina, to be covered by a thin lamina of lead. Lamina 10 is suitably of a thermoplastic material (of which this is one) which, when heated to a specified temperature, shrinks in a way such that internal forces are generated which cause the material to assume a geometry wherein various points of the material move to minimal spacing distances from other points of the material. Since the minimal spacings constitute a uniform value, the thickness of the lamina throughout the laminal area is determined by this minimal spacing, rather than the mechanical factors that determined the laminal thickness distribution prior to heating. If certain edges of the lamina 10, for example, and preferably the parallel longitudinal border edges 11 and 12, are tightly held against relative movement or adjustment in response to any of such internal forces, the intermediate body portion 13 of the sheet will readjust itself to assume such minium dimensions, with the result that all of such minimum dimensions will be relatively linear and all will lie in the same direction. Consequently, the sheet, by reason of its internal self-tensioning, adjusts itself to assume a taut, flat, planar condition.

By utilizing this heat-shrinkable characteristic of the plastic material, it becomes possible to achieve a corresponding self-adjustment of a superposed, extremely thin lamina of lead, so that, in the end limit of the adjusting process, the thin lead lamina also assumes a physical disposition of extreme flatness, all in one plane. Prior to the heating operation, therefore, it is possible to dispose a multiplicity of laminal units, i.e., a plastic lamina with a thin lead lamina secured thereto, for a final or ultimate spacing between succeeding units of extreme closeness, e.g., .002 inch, while at the same time being assured that the laminal units will assume an even flatter condition and therefore a greater degree of parallelism as a consequence of the heating operation.

Lamina 10 has a planar shape which differs from the rectangular by virtue of its arcuate concave edges 14 and 15. Edges 14 and 15, with parallel edges 11 and 12, form the peripheral boundary of the plane of lamina 10. The shape of edges 14 and 15 is of importance. It was found that with rectangular plastic lamina, the tension forces internally generated during the heating operation resulted in buckling of the unsupported edges. It was discovered that the buckling could be eliminated by removing a portion of the planar area at the edges which are unsupported in the heating operation. Although the concave arcuate cut-out which defines edges 14 and 15 of lamina 10 was found to be a particularly effective geometry for the purpose, other indentive non-linear shapes may also be used when other circumstances indicate their desirability. No well-defined theory has been developed to explain the buckling of straight, unsupported edges and the freedom from buckling of the indented edges. However, it is believed that in the case of the straight edge, all of the unbalanced tension forces generated at the edge during heating, which of course are internal forces, are directed parallel and into the plane of the lamina, rather than toward empty space. As a consequence, expansion does not take place in the direction of the free space, but rather compression of the plane takes place, whereby a rippling or buckling of the lamina results. With an arcuate concave edge, however, a portion of the force vectors are tangent to the arcuate edge and have components directed, at least partially, toward an area of free space. Related indentively non-linearly shaped edges provide a similar effect.

Lamina 10 is coated with a thin continuous film or lamina 16 of lead (or other X-radiation absorptive material) in any one of several ways known to those skilled in the art. Thus, lamina 16 may be evaporated on to lamina 10. It may be painted on, or sprayed on with an appropriate vehicle. Lead compounds such as white lead pigment of common paint are an X-radiation absorbing material and may be used to coat lamina 10 by spraying or brushing on a paint containing it.

The construction of FIGURE 1 comprising plastic lamina 10 with absorbing lamina 16 secured thereto will hereafter be referred to as the lamination unit 17. Typical dimensions for unit 17 in Soller Slits construction for X-ray diffraction and spectroscopy are: length of parallel edges 11 and 12, four inches; distance between edges 11 and 12, one inch; greatest depth of indentation of edges 14 and 15, one-quarter of an inch; thickness of lamina 10 may be a major fraction of .001 inch and of lamina 16, a minor fraction of .001 inch. A typical collimator may comprise approximately 170 lamination units, with each being spaced .002 inch from the next unit, to form a collimator about half an inch thick in the direction perpendicular to the planes of the lamination units.

The multiplicity of lamination units formed as unit 17 of FIGURE 1 are assembled as shown in expoded view in FIGURE 2, with each unit placed on a pair of spaced elongated flat spacer bars 18 and 19, so disposed as to engage the longitudinal edge borders 11 and 12 of the adjacent top and bottom plastic sheets. It will be readily understood upon reference to FIGURES 2 and 3, that the application of pressure on the bars 18 and 19 on both sides of the assembled stack of lamination units in a direction perpendicular to the planes of unit 17, as indicated by pressure arrows 23, results in the laminations being compressed at their edges 11 and 12 and held against relative displacement insofar as those side border edges 11 and 12 are concerned. Each plastic lamina 10, however, is free to adjust itself in the intermediate body portion 13 between the two side border edges 11 and 12. An appropriate thickness for the space bars 18 and 19 compatible with the above indicated dimensions of laminas 10 and 16 is .002 inch. For ease in visual comprehension, certain dimensions in the drawings have been drawn disproportionately. Thus the spacing bars 18 and 19, which may be .002 inch thick, may typically be one-eighth of an inch wide. However, to draw the thickness in proportion would undesirably destroy helpful visual detail.

The stacked assembly shown is mounted within a box structure 24 that serves to surround, contain and support the assembly of plastic and metal laminas. The pressures desired in the assembly shown in FIGURE 2 and indicated by the pressure arrows 23 are suitably provided in the box structure 24 through the medium of the box cover plate 25 and adjustable pressure screws 26 and 27. The box cover 25 is suitably anchored to the walls of the box 24, after which the pressure screws 26 and 27 are threaded downward to engage and press against the top pressure bars 28 and 29 that are horizontally disposed and vertically aligned above their respective stacks of spacing bars 18 and 19.

The entire assembly of FIGURES 2–3 is heated to an elevated temperature of about 150° centigrade for an interval of approximately 10 minutes, after which the entire assembly is permitted to cool slowly.

As a consequence of the heating operation, internal stresses are generated within each of the plastic sheets. These internal stresses tend to shrink the material of each plastic sheet to a dimension that represents the minimum volume of each sheet of material. Since these forces tend to reduce themselves to a minimum, they will correspondingly adjust the disposition of the material of the sheet to minimum dimensions so that the spacing between adjacent incremental areas of the sheet will be substantially linear. Consequently, in the limit, or end result, all of the linear dimensions will lie in the one plane and there will be no deviations transverse to that plane. Cooling the plastic strengthens the material without changing its shape any further. As a result, the thin lead layer or coating on each plastic lamina similarly assumes a flat planar disposition. All of the lamination units become, in this way, flat planar parallel surfaces whose relative spacing is controlled entirely by the thickness dimensions of the spacing bars 18 and 19.

Soller Slits, i.e., X-ray collimators, may in this way be constructed, in accordance with the invention, with a fine spacing between the metallic sheets to as small and close a dimension as the limiting thickness of the spacer bars 18 and 19. The two sets of pressure bars 28 and 29 provide the necessary strength to hold the spacer bars 18 and 19 in their original flat condition against distortion from the pressure forces of the two pressure screws 26 and 27. In addition, spring loading (not shown) may be used between the pressure bars 28 and 29, and screws 26–27 to insure a uniform application of pressure on the spacing bars and edges of the laminas, despite variations in temperature and humidity.

The invention, as related to Soller Slits, is not limited to any specific plastic material nor to any specific absorber, since any plastic material may be utilized that has the desired characteristics that will cause it to develop the internal tension forces when heated and cooled as is done in this invention, and any X-ray absorber of suitable density may be used that is opaque to X-rays.

The advantages of the invention are not restricted to X-ray collimators. It may be noted that the construction of FIGURES 1–3, with very little change, makes an excellent capacitor. Thus, the metal laminas 16 may be of copper (or other highly electrically conductive metal) and box 24, in which the lamination units are arranged, may be of insulating material completely circumscribing the units. Then if the sequence of copper laminas is considered as interlaced capacitor plates and is electrically connected accordingly, i.e., alternate copper laminas in the series are wired together, a precision capacitor results. The physical dimensions indicated above as appropriate for Soller Slits may be changed to provide capacitors having values of capacitance which are practical in various electrical circuit applications. Furthermore, the spacing bars 18 and 19 may be removed.

FIGURE 4 is directed to a microwave strip line in accordance with the principles of the invention. A dielectric sheet or lamina 40 (similar in all respects to lamina 10 of FIGURE 1), which may be of the terephthalic acid polyester, has coated on its lower face a thin sheet or lamina 41 of highly conductive metal such as silver or copper. Conductive lamina 41 is the ground plane of the stripline and may be applied to lamina 40 by evaporation techniques. On the opposite face of lamina 40 from ground plane lamina 41 is a strip 42 of the same metal as the ground plane. Strip 42 constitutes the strip conductor of the microstrip line.

Strip 42 may also be applied to dielectric 40 by evaporation and formed uniformly by etching or relating techniques known in the printed circuit art. Microwave energy, as is known to those skilled in the art, propagates through the dielectric 40 guided by the conductive boundaries defined by the ground plane 41 and strip conductor 42.

To insure that the surfaces of dielectric 40 are flat, and therefore metal surfaces 41 and 42 are uniformly parallel to each other along the length of the device, the entire structure is processed in accordance with the principles of the invention. Thus, the terephthalic acid polyester lamina 40 is rigidly supported along its edges 43 and 44, and the entire structure heated and cooled in the same way as described above, relative to the device of FIGURES 1–3.

In this way, a high degree of parallelism between conductors 41 and 42 is achieved, and the consequent elimination of reflection and radiation losses that would result from impedance discontinuities in the strip line.

It will thus be seen that the objects set forth above, among those made apparent from the preceding description, are efficiently obtained. Since certain changes may be made in carrying out the above process and in the constructions set forth without departing from the scope of the invention, it is intended that all matters contained in the above description and shown in the accompanying drawing shall be interpreted as illustrative and not in a limiting sense.

What I claim is:

1. An X-ray collimator comprising a plurality of sets of spaced planar lamina: each set comprising a planar lamina of plastic material having the property of decreasing one of its dimensions when heated to a predetermined temperature, said plastic planar lamina having each of two opposite edges forming non-linear indented shapes; and a second planar lamina secured to a face of said plastic lamina to form a single planar integral unit, said second lamina comprising an X-ray absorbent material having different physical properties from that of said plastic lamina.

2. A device as recited in claim 1, including a third lamina secured to said plastic lamina on the opposite face thereof from said second lamina, said second and third laminas having similar physical properties.

3. A collimator for an X-ray beam, comprising: a plurality of sheets of polyethylene of generally rectangular form and having an X-ray absorbent metal coating thereon having a segment removed at each short edge from between the two long side edge corners, the sheets being arranged as superposed layers; elongated flat spacers between adjacent sheets and extending along the long edges of the sheets to hold them spaced apart along their side edges; and means clamping the sheets and spacers along the long edges to hold them in fixed position while leaving the narrow edges free.

4. A collimator as recited in claim 3, in which the clamping means includes a boxframe to surround and support the grid assembly for handling and protection.

5. A collimating grid as in claim 4, in which the polyethylene sheets are in tension.

6. A collimator for defining the path of an X-ray beam, comprising: an elongated box enclosure having a longitudinal channel pocket defined by the base and two side walls, with a top cover securable to the tops of the side walls for anchorage and to cover the channel, the two ends of the box remaining open so the channel will define a path for the X-ray beam; a plurality of elongated, generally rectangular sheets of plastic having an X-ray absorbent metal coating thereon disposed within the channel in the box, the two long border edges of each sheet being linear and substantially parallel, and the two short border edges being cut away to leave the two end edges arcuately concave and spaced inwardly from the virtual rectangular edge of the sheet; a plurality of thin, flat linear bar spacers superposed and disposed lengthwise along the long border edges and between adjacent sheets to establish selected fixed spacings between the sheets; and means adjustably projecting through the cover to put pressure on the spacers and to hold the sheet long edges against displacement.

7. A collimating device for use with an X-ray beam, comprising: spaced thin plastic sheets as supports; each of said plastic sheets having an arcuately concave edge; a thin layer of X-ray absorbent material on each such plastic sheet; and means for supporting the plastic sheets in closely spaced separation.

References Cited in the file of this patent

UNITED STATES PATENTS

| | | |
|---|---|---|
| 2,449,066 | Friedman | Sept. 14, 1948 |
| 2,740,732 | Peck et al. | Apr. 3, 1956 |
| 2,858,248 | Hastings et al. | Oct. 28, 1958 |
| 3,013,157 | Norton | Dec. 12, 1961 |

FOREIGN PATENTS

| | | |
|---|---|---|
| 1,090,877 | Germany | Oct. 13, 1960 |